United States Patent [19]

Ford

[11] 3,978,720

[45] Sept. 7, 1976

[54] COMBUSTION DETECTOR FOR INTERNAL COMBUSTION ENGINES

[75] Inventor: Eric Harold Ford, London, England

[73] Assignee: Lumenition Limited, England

[22] Filed: June 27, 1975

[21] Appl. No.: 590,850

[30] Foreign Application Priority Data

July 5, 1974 United Kingdom............... 29983/74

[52] U.S. Cl. ................................. 73/116; 324/16 T
[51] Int. Cl.² ....................................... G01M 15/00
[58] Field of Search .......................... 73/116, 117.3; 324/16 T; 350/96 B; 431/13

[56] References Cited
UNITED STATES PATENTS 3,067,610   12/1962   Bockemwehl et al. ............... 73/116

3,678,741   7/1972   Burley................................. 73/116
3,754,139   8/1973   Swithenbank et al.......... 73/116 UX

*Primary Examiner*—Jerry W. Myracle
*Attorney, Agent, or Firm*—Larson, Taylor and Hinds

[57] ABSTRACT

Detection of the combustion within a cylinder of an internal combustion engine by sensing the visible and-/or infra-red radiation emitted on combustion by means of a quartz window in the cylinder wall or head, a fiber optic light guide and a photo-transistor. The detection may be utilized in ignition timing, or determining engine R.P.M. or cylinder misfire.

9 Claims, 4 Drawing Figures

Fig.1.

COMBUSTION DETECTOR FOR INTERNAL COMBUSTION ENGINES

The present invention relates to improvements in internal combustion engines, and in particular to a method of detecting a predetermined value of pressure in a cylinder of the engine at each firing cycle.

In my co-pending U.S. Pat. application Ser. No. 572,889 now abandoned, there is disclosed an electronic ignition system for an internal combustion engine in which a predetermined value of pressure in a cylinder of the engine is sensed at each firing cycle, the crankshaft position at which this predetermined value of pressure occurs being compared with a fixed crankshaft position, and an advance or retard of the ignition is effected from a result of this comparison in order to maintain the predetermined crankshaft position of the predetermined value of pressure irrespective of the speed and/or load on the engine as well as all other parameters which can affect the ignition timing of the engine.

In two of the examples given, this predetermined value of pressure can be sensed either by an electromechanical transducer device in the form of a piezoelectric detector, or by voltage detecting means associated with a second spark plug which is short-circuited when the burning mixture reaches its points.

In a third example, use is made of a fibre optic light guide associated with a photo-transistor for sensing this predetermined value of pressure utilizing the visible and/or infra-red radiation of the combustion.

There are many other uses, outside the scope of closed loop opto-electronic ignition systems, in which the detection of this predetermined value of pressure can be employed. For example, it could be extended to other types of ignition systems, such as magnetic triggers, or it could be utilized for counting engine R.P.M.

It is therefore an object of the present invention to extend the visible and/or infra-red method of detection outside the field of closed loop opto-electronic ignition systems.

According to the present invention there is provided apparatus for detecting the visible and/or infra-red radiation produced as a result of combustion in a given volume within a cylinder of an internal combustion engine.

Preferably, the means for detecting the visible and/or infra-red radiation comprises a photo-transistor sensitive to the radiation to be detected, a quartz window located in the cylinder wall at an appropriate position, and a fibre optic light guide positioned between the quartz window and photo-transistor.

The present invention will now be described in greater detail by way of example, with reference to the accompanying drawing, wherein.

Figure 1:
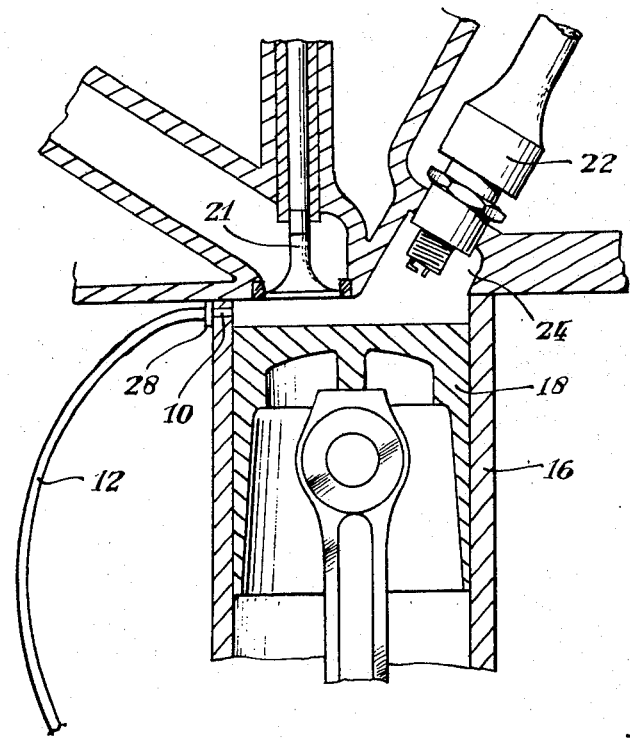
FIG. 1 is a diagrammatic view of a first preferred form of detecting the radiation due to combustion in a cylinder of an internal combustion engine.

Referring now to FIG. 1, the device for detecting combustion within a cylinder of an internal combustion engine includes a quartz glass window 10, a fibre optic light guide 12 and a photo-transistor 14. The quartz glass window 10 is mounted in an aperture of the wall of a cylinder 16 near the upper end thereof above the highest point which the piston 18 reciprocating within the cylinder 16 can reach. The photo-transistor 14 is mounted in any convenient location. Where the device is to be used with the ignition system disclosed in my copending U.S. application Ser. No. 572,889 the phototransistor is preferably housed within the distributor of the engine along with the rest of the double-trigger integrated circuitry. The collector-emitter path of the photo-transistor 14 is in series with a resistor 15 across a 12 volt supply. When no visible and/or infra-red radiation is transmitted along the fibre-optic light guide 12, the photo-transistor is off and the output terminal 20 is at + 12 volts. On the other hand, when combustion is detected, the photo-transistor is energized and the voltage at the output terminal 20 falls to substantially 0 volts.

It will be appreciated that it is important that the radiation generated by the spark is not visible to the photo-transistor. In the case of the embodiment of FIG. 1 for an engine with overhead valves 21, this is achieved by the spark plug 22 being housed at the side in a recessed combustion zone 24 so that there is no direct line of sight between the spark plug 22 and the quartz window 10.

Figure 2:
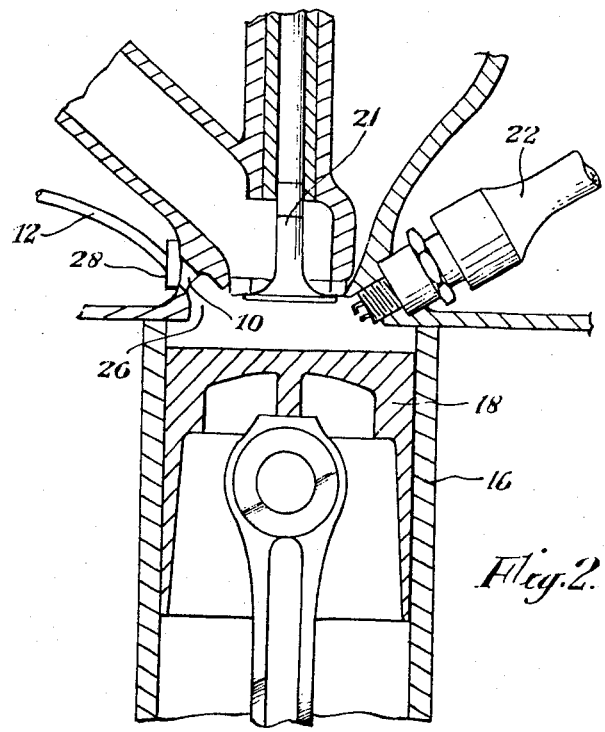
FIG. 2 is a diagrammatic view of a second preferred form.

Alternatively, as shown in FIG. 2, the spark plug 22 and quartz window 10 are arranged on opposite sides of the cylinder, but the quartz window is arranged in a small recessed zone 26 to look down on top of the piston 18, and therefore does not receive any light or radiation from the spark produced at the spark plug 22. In this respect, it will be appreciated that the effective conical angle of the radiation passing through the quartz window 10 as seen by the photo-transistor is only 10° wide.

The fibre optic light guide 12 is of any appropriate length, one end of which is fixed opposite the quartz window 10 by appropriate clamping means 28, whilst the other end is fixed opposite the base electrode of the photo-transistor 14.

In operation, the photo-transistor 14 is energized as soon as radiation, whether visible and/or infra-red, is detected through the quartz window 10. Therefore, the precise crankshaft angle at which the burning gases of the compressed mixture reach the quartz window 10 can be accurately determined by the signal produced on energization of the photo-transistor 14. In the case of a closed loop ignition system, if this value does not agree with the predetermined crankshaft angle at which energization of the photo-transistor 14 should occur, then the ignition timing is either advanced or retarded so that the two signals applied to a comparator or AND gate substantially coincide, as disclosed in copending U.S. Pat. application Ser. No. 572,889. The device may be fitted to one, or a plurality, or all the cylinders of the internal combustion engine.

Figure 3:
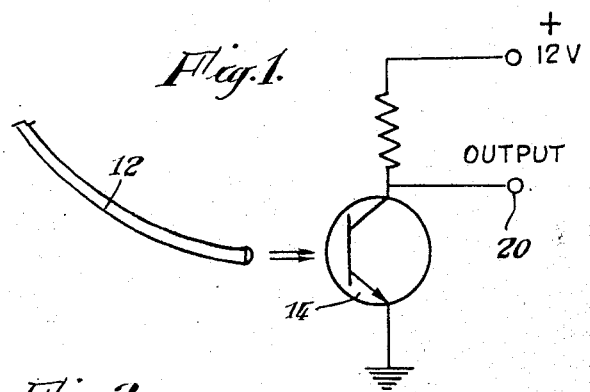
FIG. 3 is a block diagram illustrating how the invention can be applied to counting engine R.P.M.
Figure 3:
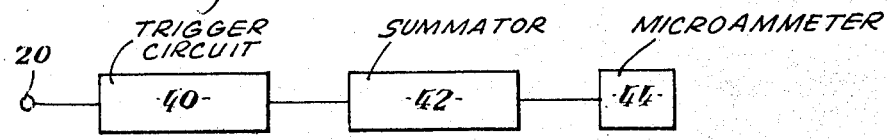

On the other hand, the invention can be used outside the field of closed loop ignition. For example, as shown in FIG. 3, it may be used for counting engine R.P.M. The output from the photo-transistor 20 would be applied direct to an inverse switching trigger circuit 40 of the type comprising the transistor pair disclosed in U.K. Pat. No. 1,289,210. The output from this inverse switching trigger circuit 40 would be applied to a summator circuit 42 of the type comprising the transistor and capacitor combination disclosed in U.K. Pat. No. 1,289,210. The output from the summator circuit 42 is then applied to a microammeter 44 or other suitable measuring instrument, which would give a direct reading of engine R.P.M.

Figure 4:
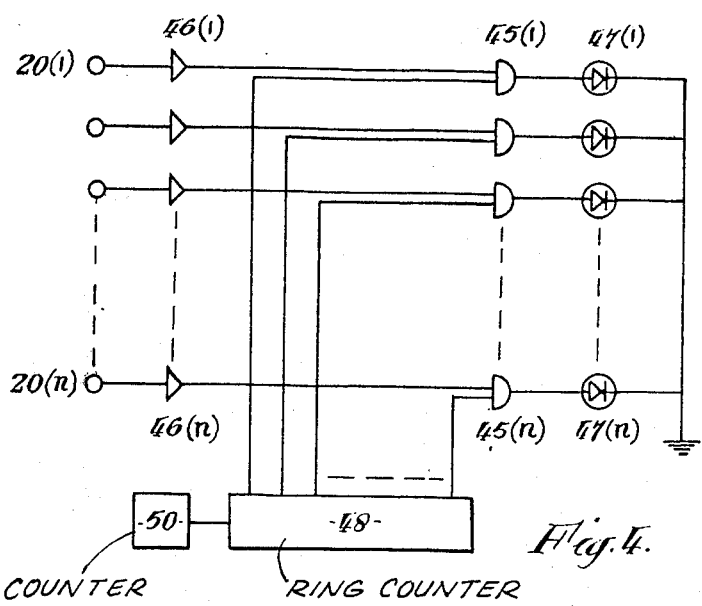
FIG. 4 is a circuit diagram illustrating how the invention can be applied to detecting the misfiring of one or more cylinders in the engine.

In the case where the device is fitted to every cylinder, it may be used to detect whether or not one or more of the cylinders is misfiring. Referring to FIG. 4, the outputs from the terminals 20(1) to 20(n) associated with respective photo-transistors, each receiving radiation from one of the n cylinders in the engine, are after inversion in respective inverters 46(1) to 46(n) applied to first inputs of exclusive OR circuits 45(1) to 45(n). The second input to each of these gates receives an input from the respective outputs of a ring counter 48. The ring counter 48 is synchronized from a counter 50 associated with the ignition system, such as the counter disclosed in my copending U.S. Pat. application Ser. No. 321,660, and the outputs therefrom are connected to the second inputs to the exclusive OR gates in synchronism with the order of firing of the cylinders in the engine. The outputs from the exclusive OR gates 45(1) to 45(n) are applied to light emitting diodes 47(1) to 47(n).

The operation is as follows. As long as a "1" output from the photo-transistor 14x appears at the first input to the exclusive OR gate 45x at the same instant there is an appropriate "1" from the associated output of the ring counter 48, the exclusive OR gate does not provide an output. Likewise, when two "0" are present at all other times, there is no output. However, if there is a misfire, the first input of the exclusive OR gate receives a 0 at the instant the second input receives a 1 from the ring counter 48. Under these conditions, the exclusive "OR" gate gives a 1 output to energize the light emitting diode 47x and thus indicate which cylinder is misfiring.

What I claim and desire to secure by Letters Patent is:

1. Apparatus for detecting radiation of a given range of wavelengths from the group comprising visible, intra-red and both visible and infra-red, which radiation is produced as a result of combustion in a given volume within a cylinder of an internal combustion engine, said apparatus comprising a photo-transistor sensitive to the radiation to be detected; a quartz window located in the cylinder at a position beyond that occupied by the piston at top dead center; and a fibre optic light guide, the ends of which are positioned between the quartz window and the photo-transistor.

2. Apparatus according to claim 1, including as many photo-transistors, quartz windows and fibre optic light guides as there are cylinders in the engine, and additionally including as many exclusive OR gates as there are cylinders in the engine, means for applying an inverted output of each photo-transistor to the first input of respective exclusive OR gates, a ring counter synchronized with the engine for supplying 1 outputs on output lines connected to the second inputs of the OR gates, and means for detecting when an exclusive OR gate has a 1 output as a result of a 0 – 1 combination on the first and second inputs.

3. Apparatus according to claim 2, wherein a row of visible diodes comprise the means for detecting a 1 output from the exclusive OR gates, said diodes on illumination indicating which cylinder is misfiring.

4. Apparatus according to claim 1, wherein the quartz window is located in a wall and a spark plug is located in a recessed zone so that there is no direct line of sight between the spark plug and the quartz window.

5. Apparatus according to claim 1, wherein the quartz window is located in a recessed zone in the cylinder head of the engine and out of the direct line of sight of the spark plug.

6. Apparatus according to claim 1 including a fast inverse switching trigger connected to the output of the photo-transistor, a summation circuit connected to the output of the trigger, and an indicating instrument connected to the output of the summation circuit for measuring the R.P.M. of the engine.

7. Apparatus according to claim 1 including as many photo-transistors, quartz windows and fibre optic light guides as there are cylinders in the engine, and means for determining whether any one or more of the cylinders of the engine is misfiring.

8. Apparatus according to claim 7, wherein said means for determining misfire comprises as many exclusive OR gates as there are cylinders in the engine, means for applying an inverted output of each photo-transistor to the first input of respective exclusive OR gates, means for applying pulses to the second inputs of the exclusive OR gates in sequence and in synchronism with the firing of the cylinders, and means for detecting when an exclusive OR gate has a 1 output as a result of the first and second inputs.

9. Apparatus according to claim 8, wherein a ring counter synchronized with the engine supplies 1 outputs on output lines connected to the second inputs of the gates.

* * * * *